United States Patent [19]

Lapeyre

[11] 3,905,471
[45] Sept. 16, 1975

[54] SHRIMP DRY FEEDER MECHANISM

[75] Inventor: Fernand S. Lapeyre, New Orleans, La.

[73] Assignee: The Laitram Corporation, New Orleans, La.

[22] Filed: June 11, 1973

[21] Appl. No.: 368,842

[52] U.S. Cl. ............................... 198/161; 198/167
[51] Int. Cl. ............................................ B65g 15/00
[58] Field of Search ............ 198/160, 161, 167, 123

[56] References Cited
UNITED STATES PATENTS

| | | | |
|---|---|---|---|
| 265,769 | 10/1882 | Dillman | 198/161 |
| 2,920,355 | 1/1960 | Clark | 198/167 |
| 3,067,855 | 12/1962 | Lambert | 198/161 |
| 3,083,810 | 4/1963 | Zebarth et al. | 198/123 |

Primary Examiner—Evon C. Blunk
Assistant Examiner—Joseph E. Valenza
Attorney, Agent, or Firm—Wilkinson, Mawhinney & Theibault

[57] ABSTRACT

The present disclosure is directed to a dry feed mechanism employed in a shrimp feeder tank having an inclined endless conveyor in which a pair of rotary shafts having tines extending radially of and spaced along the shafts are mounted in a superstructure supported on the endless conveyor frame. One of the shafts is movable toward or away from the conveyor to regulate the rate of feed and to attain the desired distribution of shrimp over the upper run of the endless conveyor dependent upon shrimp size. The tines are curved and driven in a direction opposite to the travel of the conveyor to rake off shrimp at a predetermined level of conveyor feed.

1 Claim, 7 Drawing Figures

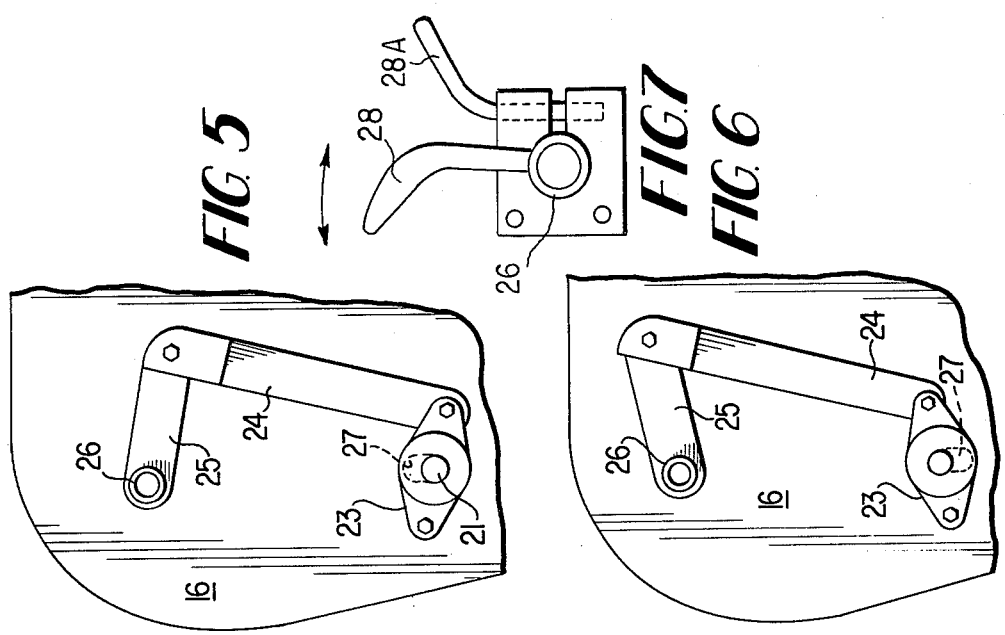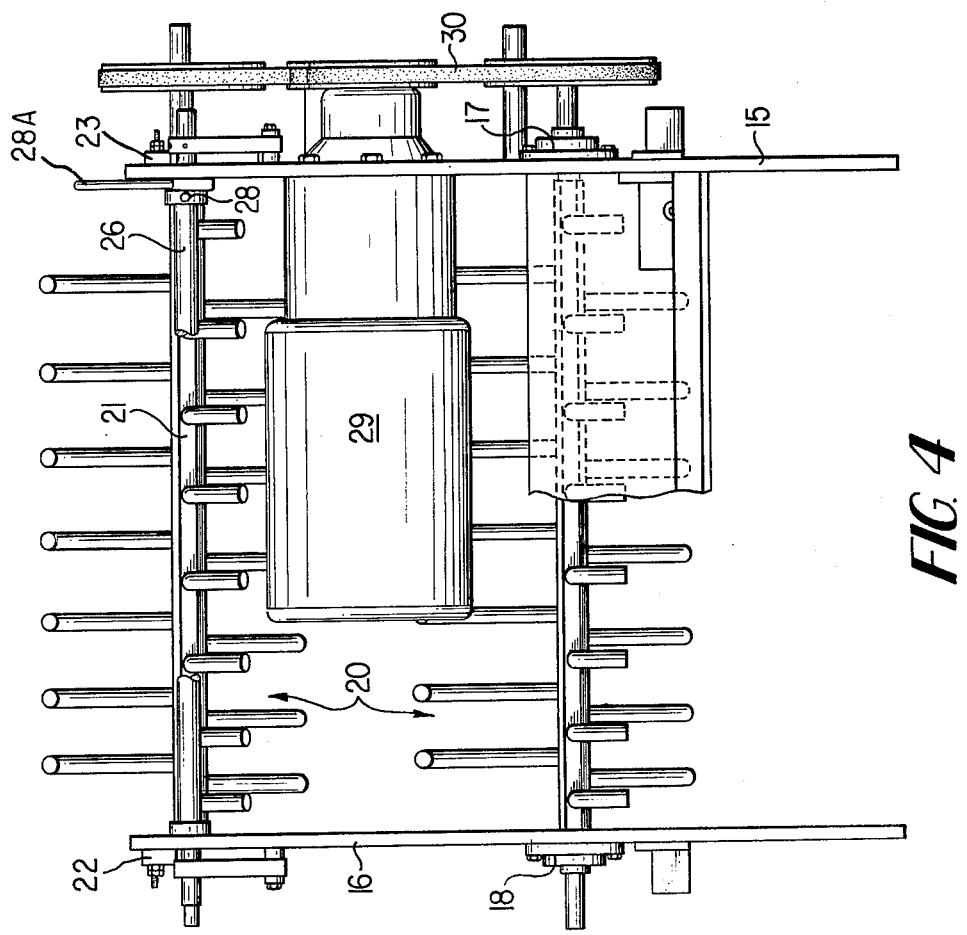

SHRIMP DRY FEEDER MECHANISM

THE PRIOR ART

The broad combination of a feeder tank having an inclined conveyor is shown in FIG. 14 of U.S. Pat. No. 2,574,044 and the conveyor was improved as shown in U.S. Pat. application Ser. No. 229,632 filed Feb. 28, 1972 at FIGS. 3 through 7 inclusive. The prior art required the presence of water for buoyancy floatation of the shrimp with the assistance of a paddle to distribute the shrimp on the top run of the endless conveyor.

I have found that with the use of rotary tines having curved ends in a direction opposite to the direction of rotation and opposite to the direction of travel of the upper run of the conveyor distribution of raw shrimp is attained and this is particularly important when the shrimp feeder tank is subject to any motion such as on a factory ship at sea when the water in the feeder tank does not maintain a constant level and the wave action of the feed paddle does not evenly distribute the shrimp on the conveyor.

The best prior art known to me to date are the following: U.S. Pat. Nos. 586,778; 2,920,355; 1,487,882; and 2,301,088.

Also corrosion problems incident to use of salt water in the feeder tank can be eliminated by dry feed.

With the foregoing and other objects in view, the invention will be more fully described hereinafter, and will be more particularly pointed out in the claims appended hereto.

In the drawings, wherein like symbols refer to like or corresponding parts throughout the several views:

FIG. 4 is a top plan view of the tine support and drive mechanism.

FIG. 5 is a side elevational view of the adjustable tine shaft raising and lowering mechanism with the shaft in its lowermost position.

FIG. 6 is a view similar to FIG. 5 with the tine shaft and its support bearings raised to its upper most position.

FIG. 7 is an enlarged side elevational view of the twist lock for controlling the position of the front shaft.

Figure 1:
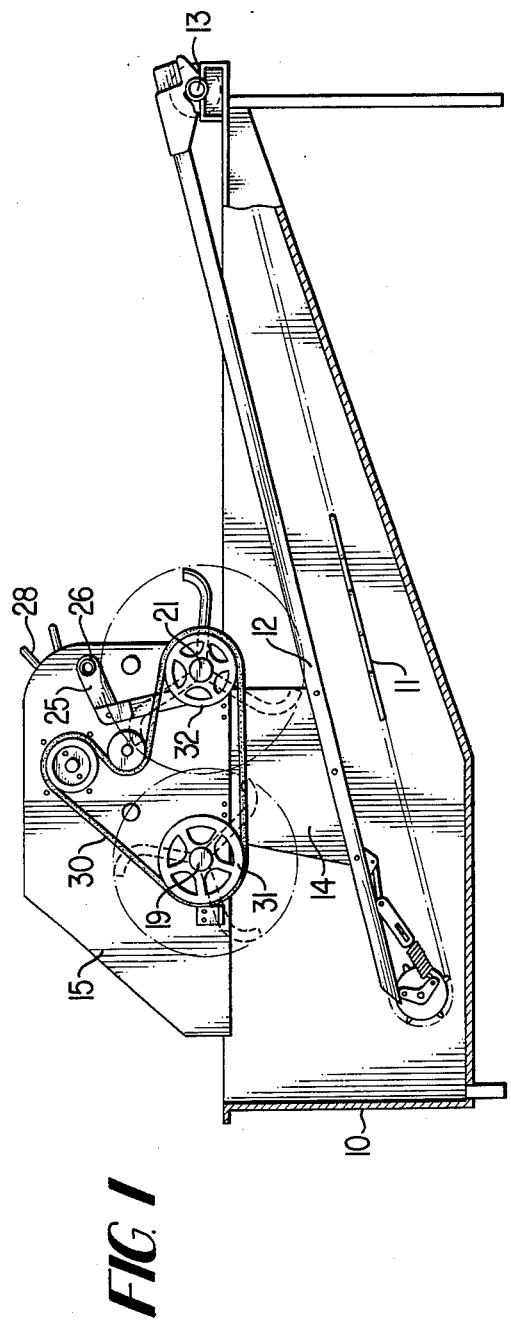
FIG. 1 is a longitudinal vertical sectional view with parts broken away and parts shown in section of the apparatus of the present invention having parts shown in solid section lines.
Figure 2:
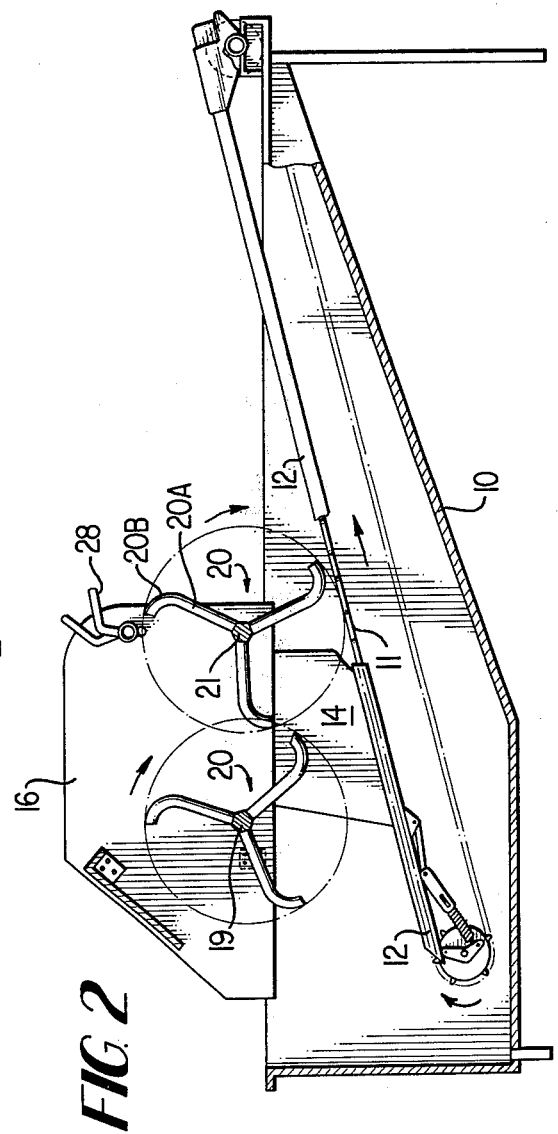
FIG. 2 is a longitudinal sectional view with parts broken away and parts shown in section through the inclined conveyor and tine feed mechanism.
Figure 3:
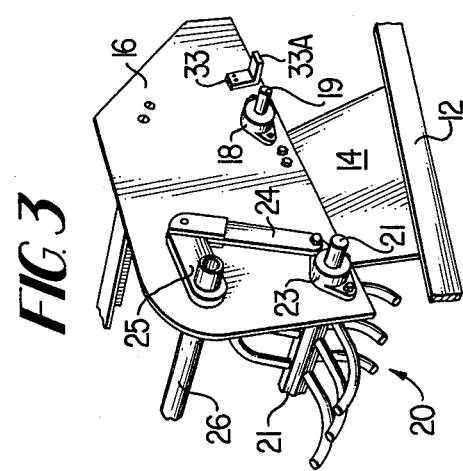
FIG. 3 is a fragmentary perspective view of one end of the tine shaft support mechanism and conveyor frame.

Referring now to the drawings and for the moment to FIGS. 1 through 3 inclusive, 10 designates a shrimp feed tank having an inclined endless conveyor 11 mounted on a frame structure 12 and pivoted at its upper end at 13 for movement into and out of the tank 10. The details of the conveyor and its drive mechanism are shown in application Ser. No. 229,632 above identified.

Upstanding from the conveyor frame 12 are a pair of spaced plates 14, one on each side of the conveyor frame which carry the rotary tine shaft support plates 15, 16. Rotatably journalled in bearings 17, 18 carried by plates 15 and 16 is a rear rotary tine shaft 19 having tines 20 extending radially off the shaft and being spaced along the shaft in the staggered arrangement shown in FIG. 4.

A front rotary tine shaft 21 is carried in bearings 22, 23 which are pivotally connected to link arms 24 and 25. The arms 25 are secured to an adjustment shaft 26 which may be rotated to control the raising and lowering of the shaft 21 which is permitted by the slotted openings 27 in the rotary tine shaft support plates 15 and 16. A twist lock mechanism 28 is provided to retain any desired up or down setting of the forward or front shaft 21.

The tines 20 have a major portion 20A and a curved portion 20B which is curved opposite to the direction of rotation and positioned on the shafts so that the portions 20B rake the excess layer of the shrimp backwardly and down the inclined conveyor opposite to its direction of travel. The reverse curvature of the tines eliminates the picking up of the shrimp by the tine and carrying the shrimp over the tine shaft 19.

The tine shafts 19 and 21 are rotatably driven by an electric motor 29 which drives a belt and pulley drive 30 the pulleys of which 31, 32 are secured to rotate the shafts 19 and 21 in the same clockwise direction as viewed in FIG. 2.

The inclined conveyor 11 is retained above the bottom of the feed tank 10 by limit stops 33 which are secured to the plates 15 and 16 so that the portions 33A rest upon the top of the end walls of the feeder tank.

When shrimp are dumped into the tank at the lower end of the inclined conveyor 11 the motor 29 through V-belt drive 30 rotates the tine shafts 19 and 21 clockwise as viewed in FIG. 1 which causes the tines to rake backwardly the excess shrimp carried forwardly by the conveyor 11. Depending upon the desired feed rate or size of the shrimp the twist lock handle 28A is backed off to permit the shaft 26 to be rotated by handle 28 in either direction as shown by the arrow in FIG. 7 to the desired position after which handle 28A is then twisted to lock shaft 26, to maintain the desired setting of the tine portions 20B above the upper run of the endless feed conveyor 11.

What is claimed is:

1. For use with a shrimp feed tank a bulk dry shrimp feed mechanism comprising
    a. an endless conveyor frame supporting an endless conveyor thereon adapted to be pivoted to the feed tank at its forward end,
    b. a shrimp metering frame carried by said conveyor frame and spaced above said conveyor,
    c. a first shaft carried by said shrimp metering frame and spaced above said conveyor, and journaled for rotation in said metering frame at a fixed distance from said conveyor frame,
    d. a second shaft carried by said metering frame mounted for movement toward and away from said conveyor,
    e. dry feed tines carried by said first and second shafts spaced along said shafts across the width of said feed tank, said tines having curved ends curved in the direction opposite to the direction of rotation of said shafts and travel of said endless conveyor,
    f. drive means for rotating said shafts and tines relative to said conveyor to regulate the amount of shrimp distributed on said endless conveyor, g. a rockably mounted adjustment shaft journaled in said metering frame positioned above said tine shaft, and h. a bell crank arm secured for rotation with said adjustment shaft at one end and the bearings for said second tine shaft at the other end so that upon rotation of the adjustment shaft said second tine shaft and its tines will be moved toward and away from said conveyor to regulate the feed rate of shrimp upon said conveyor.

* * * * *